United States Patent [19]

Kropp et al.

[11] 3,954,910

[45] May 4, 1976

[54] PROCESS FOR REMOVAL AND RECOVERY OF UNREACTED MONOMERS FROM RESINOUS POLYMERS

[75] Inventors: Einar Peter Kropp, Mantua; John Wesley Hougland, Lima; Gary Grant Innocenti, Sagamore Hills, all of Ohio

[73] Assignee: The Standard Oil Company, Cleveland, Ohio

[22] Filed: Apr. 12, 1974

[21] Appl. No.: 460,339

[52] U.S. Cl. ............................... 260/879; 260/821; 528/499; 528/501; 526/341; 526/342; 526/328
[51] Int. Cl.² .......................................... C08F 6/22
[58] Field of Search ............... 260/879, 821, 85.5 S, 260/88.7 B

[56] References Cited

UNITED STATES PATENTS

| | | | |
|---|---|---|---|
| 3,006,872 | 10/1961 | Benedict et al. | 260/821 X |
| 3,248,455 | 4/1966 | Harsch et al. | 260/879 |
| 3,345,430 | 10/1967 | Simon et al. | 260/876 R |
| 3,821,348 | 6/1974 | Planz | 260/821 X |

Primary Examiner—William F. Hamrock
Attorney, Agent, or Firm—John F. Jones; Sherman J. Kemmer; Evelyn R. Kosman

[57] ABSTRACT

The invention is concerned with the effecient removal and recovery of unreacted monomers from polymer latices prepared by emulsion polymerization.

8 Claims, 1 Drawing Figure

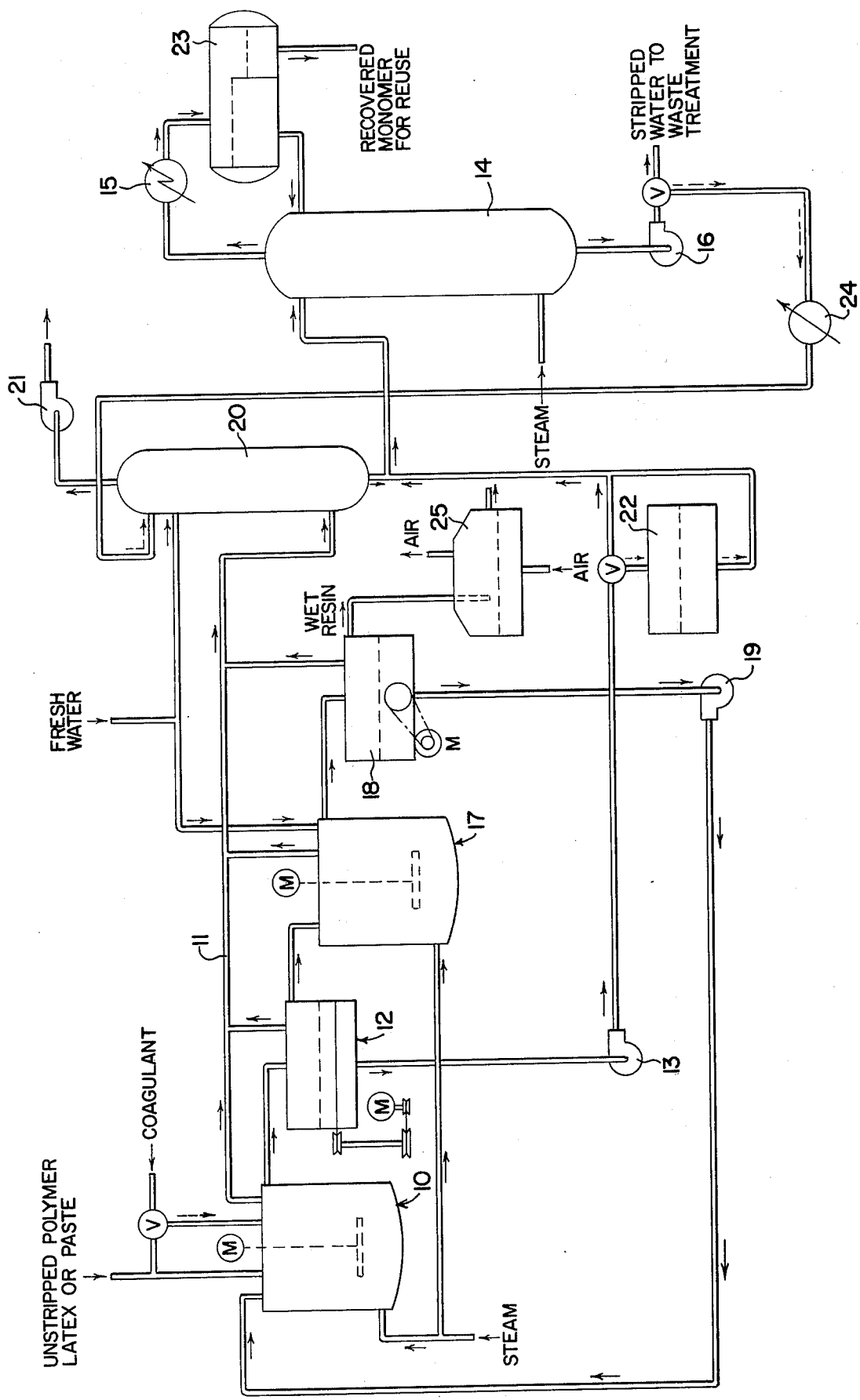

3,954,910

PROCESS FOR REMOVAL AND RECOVERY OF UNREACTED MONOMERS FROM RESINOUS POLYMERS

This invention relates to a continuous process for the removal and recovery of unreacted monomers from unstripped resinous polymer latices. More particularly, this invention relates to a process for the removal and recovery of residual monomers from a resinous polymer latex during the coagulation and washing operations of the solid polymer.

The efficient removal and recovery of unreacted monomers from the polymer is highly desirable for the manufacture of substantially monomer-free resins suitable for use in food packaging; to maintain the amount of monomer emitted to the atmosphere in the recovery process at a level which falls within the standards set by environmental protection agencies; and to improve the overall economics of polymer manufacture through the recycle of unpolymerized monomers and improved reactor efficiency.

The process of the present invention has a number of significant advantages over the heretofore conventional practice of batch stripping the monomers from the polymer latex while in the polymerization reactor. In the present process an overall increase in reactor capacity is obtained by a reduction in reactor cycle time due to the elimination of stripping time and the reduction in the cooling and cleaning times required as a result of less reactor fouling. An improvement in product color is observed because of less exposure of the polymer to elevated temperatures normally used in reactor stripping. The level of monomers emitted to the atmosphere from the dryer is greatly reduced. An improvement is observed in the reactor system service factor due to the need for less equipment and more simplified equipment in the reactor system. These and other advantages will become more apparent upon the comprehension of the present invention.

In accordance with the present invention, an unstripped resinous polymer latex containing substantial quantities of residual monomers is coagulated using a technique such as crumb, paste or shear coagulation, as described in co-pending application, Ser. No. 229,508 filed Feb. 25, 1972. The coagulated resin-water slurry is agitated in a coagulation or setting tank for a given residence time. The slurry overflows onto a dewatering device which may be a centrifuge or a vibrating dewatering screen which separates the resin from the excess water. The resin is then washed with water in a washing tank for a given residence time, and the washed resin-water slurry overflows onto a second dewatering screen. The washed resin is then fed to a dryer to remove the water and any of the monomer that is retained on the resin. The amount of monomer that is emitted in the dryer air effluent is minimized by the optimization of the conditions in the setting and washing operations.

Small amounts of the unreacted monomer are evolved with the vapors from the setting and washing tanks and are removed therefrom by scrubbing with water in an absorber column. Most of the remaining monomer is found in the water effluent from the setting and washing tanks. The effluent from the setting tank along with the monomer-rich water from the absorber column are fed to a stripping column, and relatively pure monomers are recovered from the column overhead. The recovered monomers can then be inhibited, stored, and re-fed to the polymerization reactor. The essentially monomer-free water from the bottom of the stripper column is fed to waste treatment facilities to remove coagulants, soaps, and other impurities.

The degree of efficiency of the instant process can be realized by the fact that greater than 99 percent of the monomer initially present in the polymeric latex can be removed from the polymer stream, and greater than 90 percent of the monomer can be recovered for reuse.

A better understanding of the instant invention can be obtained by referring to a specific embodiment such as that appearing in the accompanying drawing. Employing the method of paste coagulation of the resinous polymeric latex as an example, the unstripped polymer latex containing substantial quantities of unreacted monomers is fed continuously to a fluid-moving pump, and the coagulant is metered to the pump head where the latex is coagulated. The paste is then extruded through fine orifices to form uniform particles or strands which are set or hardened in the setting tank 10. Tank 10 is provided with an agitator to suspend the polymer in the aqueous medium and a provision for the entry of steam is made to maintain the tank contents at an elevated temperature. The coagulated resin-water slurry is agitated for a given residence time, and the effluent from the setting tank overflows onto a vibrating dewatering screen 12 to separate the resin strands from the excess water. The dewatered resin retaining from about 25 to about 60 percent moisture by weight on a wet strand basis, is then fed to one or more wash tanks 17, which may be arranged in series, where it is mixed with fresh water for a given time. This tank (or tanks) is also maintained at an elevated temperature by means of steam. The wash tank effluent overflows onto a second vibrating dewatering screen 18 to separate the excess water from the resin. The washed resin is then passed to a fluid bed dryer 25 to remove any residual water and monomer that is retained on the resin, and from where the purified polymer product is reclaimed. The trace amounts of monomer vented to the atmosphere in the dryer air effluent are within the clean environment limits. Minor amounts of monomer vapor evolved during the setting and washing operations are removed overhead from the setting tank 10, wash tanks 17, dewatering screens 12 and 18 and are passed, via conduit 11, to a packed vent scrubber column 20. The monomer is scrubbed from this vapor stream with water in the scrubber column, and the resulting monomer-rich water effluent from the scrubber column is fed to the steam stripper column 14 along with the aqueous effluent from the dewatering screen 12, which optionally may pass through a filter 22, and which contains the major portion of the residual monomer from the resin. Relatively pure monomer is taken overhead from the stripper column 14, condensed in the stripper condenser 15, and is separated from any remaining water by decantation in decanter 23. The purified monomer is then recovered for reuse. Water from the condenser is refluxed to the stripper column. The water effluent from the bottom of the stripper column is conveyed by means of pump 16 to a waste water treating area to remove coagulant and dissolved or suspended solids, or the stream is divided and part of the waste water is pumped to the treating area and part is returned to the vent scrubber column 20. The aqueous effluents from the wash tank 17 and dewatering screen 18 are recycled by means of a wash tank effluent pump 19 to the setting tank 10 for reuse.

In the instance where the method of crumb coagulation is utilized, the procedure for monomer removal is essentially the same as that employed with paste coagulation with the exception that the unstripped polymer latex containing residual monomer is fed continuously along with the aqueous solution of coagulant to the setting tank 10 wherein the coagulation takes place. Additionally, with crumb coagulation, the dewatering device 12 is preferably a centrifuge rather than a vibrating screen, and under such circumstances filter 22 may be omitted.

Polymer latices which can be treated in accordance with the present invention are those resinous polymer latices produced by means of emulsion polymerization and having heat distortion temperatures above 0°C. The polymers which are most useful in the process of this invention include those produced by polymerizing a major proportion of a mono-unsaturated nitrile, such as acrylonitrile, and optionally a minor proportion of another monovinyl monomer component copolymerizable with said nitrile in an aqueous medium in the presence of a preformed diene rubber which may be a homopolymer or a copolymer of a conjugated diene monomer.

The olefinically unsaturated nitriles useful in the present invention are the alpha, beta-olefinically unsaturated mononitriles having the structure

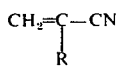

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile and methacrylonitrile and mixtures thereof.

The other monovinyl component copolymerizable with the olefinically unsaturated nitriles which is useful in this invention includes one or more of the esters of olefinically unsaturated carboxylic acids, vinyl esters, vinyl ethers, alpha-olefins, vinyl aromatic monomers, and others.

The esters of olefinically unsaturated carboxylic acids include those having the structure

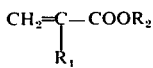

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl alpha-chloroacrylate, ethyl alpha-chloroacrylate, and the like. Most preferred in the present invention are methyl acrylate, ethyl acrylate, methyl methyacrylate, and ethyl methacrylate.

The alpha-olefins useful in the present invention are those having at least 4 and as many as 10 carbon atoms and having the structure

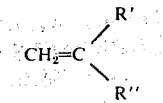

wherein R' and R'' are alkyl groups having from 1 to 7 carbon atoms, and more specifically preferred are alpha-olefins such as isobutylene, 2-methyl butene-1, 2-methyl pentene-1, 2-methyl hexene-1, 2-methyl heptene-1, 2-methyl octene-1, 2-ethyl butene-1, 2-propyl pentene-1, and the like. Most preferred is isobutylene.

The vinyl ethers include methyl vinyl ether, ethyl vinyl ether, the propyl vinyl ethers, the butyl vinvyl ethers, methyl isopropenyl ether, ethyl isopropenyl ether, and the like. Most preferred are methyl vinyl ether, ethyl vinyl ether, the propyl vinyl ethers, and the butyl vinyl ethers.

The vinyl esters include vinyl acetate, vinyl propionate, the vinyl butyrates, and the like. Most preferred is vinyl acetate.

The vinyl aromatic monomers include styrene, alpha-methyl styrene, the vinyl toluenes, the vinyl xylenes, and the like. Most preferred is styrene.

The conjugated diene monomers useful in the present invention include butadiene-1,3, isoprene, chloroprene, bromoprene, cyanoprene, 2,3-dimethyl-butadiene-1,3, 2-ethyl-butadiene-1,3, 2,3-diethyl-butadiene-1,3, and the like, and others. Most preferred for the purpose of this invention are butadiene-1,3 and isoprene because of their ready availability and their excellent copolymerization properties.

Polymerizates of particular utility in this invention and details of their method of preparation are described in U.S. Pat. Nos. 3,426,102 and 3,586,737 and in the co-pending U.S. patent application of Russell K. Griffith et al, Ser. No. 222,979 filed Feb. 2, 1972, all of these references being incorporated herein in their entirety. Specific polymerizates useful in the process of this invention include those prepared by the polymerization of 100 parts by weight of (A) at least 50% by weight of at least one nitrile having the structure

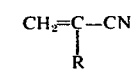

which has the foregoing designation and (B) up to 50% by weight based on the combined weights of (A) and (B) of at least one member selected from the group consisting of (1) an ester having the structure

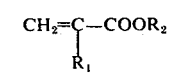

wherein $R_1$ and $R_2$ have the foregoing respective designations, (2) an alpha-olefin having the structure of

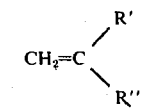

wherein R' and R'' have the foregoing respective designations, (3) a vinyl ether selected from the group consisting of methyl vinyl ether, ethyl vinyl ether, the propyl vinyl ethers, and the butyl vinyl ethers, (4) vinyl acetate, and (5) styrene, optionally in the presence of from 1 to 40 parts by weight of (C) a rubbery polymer of a conjugated diene monomer selected from the group consisting of butadiene and isoprene and optionally a comonomer selected from the group consisting of styrene and a nitrile monomer having the structure

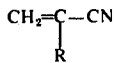

wherein R has the foregoing designation, said rubbery polymer containing from 50 to 100% by weight of polymerized conjugated diene and from 0 to 50% by weight of comonomer.

Preferably, component (A) should be present in from about 60 to 90% by weight based on the combined weights of (A) and (B) and the rubbery polymer (C) should contain more than 50% by weight of conjugated diene and more preferably from 60 to 90% by weight of the conjugated diene. It should be understood, however, that although nitrile polymers are preferred in this process, this process is not limited to nitrile polymer compositions and is applicable to any resinous polymeric latex prepared by emulsion polymerization and having a heat distortion temperature above 0°C.

In the instant process, efficiency of monomer removal and drying rate of the coagulated polymer latex is largely dependent upon the porosity of the polymer. Porosity of the resinous polymer particles is affected by the conditions under which the setting and washing operations are carried out. For maximum efficiency, the conditions of these operations are adjusted to produce particles with a porosity that retains sufficient moisture to permit ease of monomer release on washing. Therefore, the wet strand moisture content of the polymer particles is utilized as a measure of porosity. Particles having too low a porosity and hence too little moisture retention lock the monomers in the polymers so that extraction by means of a water stream is made difficult. Alternatively, particles with too high a porosity and hence too high a moisture content not only increase drying costs, but also result in the formation of increased polymer fines and polymer losses. For optimum results, resinous polymer particles having a degree of porosity so as to retain at least 25% and up to about 60% by weight of moisture, on a wet strand basis, and more preferable from about 35% to about 50% by weight of moisture on a wet strand basis, are most suitable.

The conditions affecting the porosity of the resinous polymer particles in this invention are the temperatures, latex solids concentrations, and residence times utilized in the setting and washing operations. The coagulation or setting tank contents are maintained at a temperature and residence time that yield a polymer particle having the desired moisture content for a given latex total solids. As the available latex solids content is increased, the lower the temperature and/or the shorter the residence time required. Conversely, as the available latex solids content is decreased, the higher the temperature and/or the longer the residence time required. For optimum results, the coagulation or setting tank is usually operated at a temperature near the heat distortion temperature of the particular resin being processed, and more preferably in the range of from about 10°C above to 10°C below the heat distortion temperature of the resin, and wherein this temperature falls within the range where water is maintained in the liquid state. Generally, temperatures from about 60°-99°C are most often employed, depending on the residence time utilized. The residence time of the polymer-water slurry in the coagulation or setting tank is generally in the range of about 5 to 30 minutes, but they need not be limited to this range. Resin solids concentrations in the setting or coagulation tank are most suitably in the range of from about 5 to 20 percent by weight.

Although the porosity of the polymer particles is largely determined by the conditions encountered in the setting tank, the conditions in the wash tank should be adjusted so that the porosity of the polymer is not altered during the wash treatment. To maximize the solubility of the monomers in water and their removal from the polymer particles, the operating temperatures of the wash tank should be as close to the heat distortion temperature of the resin as possible without significant further fusion of the resin. Therefore, water temperatures of from about 20°C below the heat distortion temperature of the polymer up to but not including the heat distortion temperature and wherein this range falls within the temperature range where water is maintained in the liquid state, are most advantageously employed. Resin solids concentrations in the wash tank are preferably in the same range as solids concentrations in the set tank.

The degree of monomer removal in the washing procedure can also be increased by increasing residence time. This can be accomplished by increasing the size of the washing unit or by using two or more units in series. In instances where a single washing unit is employed, residence times are generally in the range of from about 15 to 90 minutes, while shorter residence times are required when more than one unit is employed. Additionally, counter-current water flow in the washing unit may be used to obtain efficient use of water and steam. The simplest washing device is a single stirred unit. If washing residence times are large, the volume of the single or two-stage units may be too large to be economically or mechanically practical so that more efficient extraction devices such as a multistage column extractor may then be more appropriately utilized.

The coagulant employed to coagulate the polymeric latex can be an aqueous solution of any conventional coagulant, as for example, inorganic acids such as hydrochloric acid, sulfuric acid, etc. organic acids such as formic, oxalic and acetic acids, etc., water-soluble metal salts such as the chlorides, nitrates, sulfates and acetates of sodium, potassium, zinc, calcium, magnesium, aluminum, and the like, and preferably an aqueous solution of a polyvalent metal salt.

The scrubber column 20 may be packed with any of the conventional packing materials normally employed for this purpose, and materials such as pall rings or saddles are suitably employed. Alternatively, the scrubber column as well as the stripper column 14 may contain sieve trays or other types of distillation trays that minimize fouling resulting from the accumulation of polymer fines.

The present invention is further illustrated in greater detail by the following specific examples, however, it is not to be construed that the scope of the invention is limited to the examples.

EXAMPLE I

The latex used in this example was prepared by emulsion polymerization and was a copolymer of acrylonitrile and methyl acrylate in a weight ratio of 3:1 acrylonitrile of methyl acrylate, and which had been copolymerized in the presence of a diene rubber having a composition of 70% butadiene and 30% acrylonitrile, by weight. The ratio of the copolymer to rubber was 10 to 1 by weight. The latex charge contained 27% by weight of solids* and 2.4% by weight of unreacted monomer. The aqueous polymeric latex was continuously fed through a gear pump, and an aqueous solution of 45% by weight of aluminum sulfate was metered to the pump head. The alum solution caused latex coagulation, and the pump effluent had the consistency of paste. The paste was fed to a die head which contained a perforated plate in which the perforations were 7/64 inches in diameter. Continuous fluid paste strands were extruded through the perforated plate into the setting tank. The set tank maintained agitated water at a temperature of 76° to 80°C. The paste strands were broken and fused into strands averaging 3/32 inches in diameter and 1/16 to ¾ inches in length. All of the water from the first wash tank dewatering screen was continuously pumped into the setting tank and resulted in a setting tank slurry of 8.7% polymer by weight in water. The residence time in the setting tank was 13 minutes. The setting tank temperature was maintained and automatically controlled by the direct sparging of steam at 40 psig into the water supply line. The setting tank slurry overflowed onto a vibrating screen to separate the excess setting tank water from the strands. Water at 26°C was sprayed onto the setting tank overflow stream prior to screen contact to cool the strands to a temperature of between 65° to 71°C to prevent fusion of the polymer strands. The ratio of the flow rate of water to polymer was in the range of 2–3:1, by weight. The dewatered strands were conveyed to the first wash tank and mixed with water from the second wash tank screen. The water flow rate to this tank resulted in a 10% polymer-in-water slurry. The tank contents were agitated and automatically maintained at a temperaure of 68°C. The first wash tank effluent overflowed onto another dewatering screen which again removed the water from the strands. The dewatered strands were then conveyed to a second wash tank where they mixed with fresh water. The water flow rate to this tank was adjusted to maintain the polymer-in-water slurry at 10%. The tank contents were agitated and heated to 68°C by direct sparging of steam. The second wash tank effluent overflowed onto a third dewatering screen to remove the water from the strands. Residence times in the wash tanks were 41 minutes per tank. The washed polymer having a wet strand moisture content of 40% by weight, was then fed to a fluid bed dryer where they were dried to a moisture content of less than 0.3%, by weight. By means of this treatment the concentration of the monomers in the dried resin was reduced to less than 11 ppm, and the monomer emissions in the dryer effluent air were within the limits of the clean environment requirements.

*Heat distortion temp. − 70°C, 264 psi (ASTM Test D-648-56)

EXAMPLE 2

The polymeric latex used in this example was prepared by emulsion polymerization and was a copolymer of acrylonitrile and styrene in a weight ratio of 3:1 acrylonitrile to styrene, and which had been copolymerized in the presence of a diene rubber having a composition of 75% butadiene and 25% styrene, on a weight basis. The weight ratio of the copolymer to rubber was 20:1. The latex charged contained 26% solids* by weight, and 4.7% by weight of unreacted monomer. The polymeric latex was paste coagulated and processed as in Example 1, with the exception that a 22% solution of aluminum sulfate was employed instead of the 45% concentration, and the setting tank temperature was maintained at 90°C. ,6 *Heat distortion temp − 92°C, 264 psi (ASTM Test D-648-56)

We claim:

1. In the process for producing a monomerfree resinous polymer wherein said polymer is prepared by the emulsion polymerization of a major portion of a mono-unsaturated nitrile and optionally another monovinyl monomer copolymerizable therewith, in an aqueous medium and optionally in the presence of a preformed diene rubber which may be a homopolymer or a copolymer of a conjugated diene monomer, and wherein the polymeric latex prepared in said polymerization reaction is coagulated, the resulting coagulum is hardened and washed with water, and the essentially monomer-free resinous polymer recovered therefrom, the improvement comprising: removing and recovering unreacted monomer from the coagulated latex of said polymer during the hardening and washing steps of the process by:

A. heating a slurry of the monomer-containing coagulum of said polymer in an aqueous bath maintained at a temperature in the range of from about 10°C above to 10°C below the heat distortion temperature of the polymer, to set the polymer and to remove some of the monomer therefrom;

B. partially dewatering the coagulum from (A);

C. washing the partially dewatered coagulum from (B) in an aqueous bath maintained at a temperature within the range of from about 20°C below and up to the heat distortion temperature of the polymer;

D. dewatering and removing any remaining monomer from the coagulum in (C) and drying and recovering the essentially monomer-free polymer therefrom;

E. scrubbing the monomer from the vapors derived from steps (A) through (D) in an aqueous absorption zone;

F. stripping overhead the monomer from the monomer-rich aqueous effluents from steps (B) and (E) and decanting the overhead to recover essentially pure monomer therefrom.

2. The process in claim 1 wherein the coagulum in (A) is obtained by paste coagulation of the polymeric latex.

3. The process in claim 1 wherein the coagulum in (A) is obtained by crumb coagulation of the polymeric latex in the aqueous bath of A.

4. The process in claim 2 wherein some of the essentially monomer-free effluent from step (F) is recycled for use in step (E).

5. The process in claim 1 wherein the monounsaturated nitrile is a member selected from the group consisting of acrylonitrile and methacrylonitrile.

6. The process in claim 1 wherein the monovinyl monomer is a member selected from the group consisting of methyl acrylate, ethyl acrylate, methyl methacrylate, and ethyl methacrylate.

7. The process in claim 1 wherein the water recovered from (D) is recycled to the bath in (A).

8. The process in claim 5 wherein the monovinyl monomer is styrene.

* * * * *

UNITED STATES PATENT OFFICE
CERTIFICATE OF CORRECTION

PATENT NO. : 3,954,910
DATED : May 4, 1976
INVENTOR(S) : Einar P. Kropp, Wesley Hougland, Grant Innocenti It is certified that error appears in the above-identified patent and that said Letters Patent are hereby corrected as shown below:

Column 3: Line 41, after "monovinyl" insert ---monomer---

Column 3; Line 65, "methyacrylate" should be --methacrylate--

Column 4: Line 15, "vinvyl" should be --vinyl--

Column 7: Line 6, "of" should be --to--

Column 7; Line 47, after "they" insert --were--

Column 8: Line 11, delete "6" and insert the following paragraph:

--The final dried resin had a monomer content of less than 11 ppm.---

Signed and Sealed this

Sixth Day of September 1977

[SEAL]

Attest:

RUTH C. MASON
Attesting Officer

LUTRELLE F. PARKER
Acting Commissioner of Patents and Trademarks